J. Anderson.
Seeder, Harrow and Roller.

Nº 89,376. Patented Apr. 27, 1869.

Witnesses:
E. B. Cutler
Wm. H. Sterne.

Inventor:
John Anderson
by Prindle and Dyer
Attys.

JOHN ANDERSON, OF SPRINGFIELD, ILLINOIS.

*Letters Patent No. 89,376, dated April 27, 1869.*

IMPROVED COMBINED SEEDER, HARROW, AND ROLLER.

The Schedule referred to in these Letters Patent and making part of the same.

*To all whom it may concern:*

Be it known that I, JOHN ANDERSON, of Springfield, in the county of Sangamon, and in the State of Illinois, have invented certain Improvements in Combined Sowers, Harrows, and Rollers; and do hereby declare that the following is a full, clear, and exact description thereof, reference being had to the accompanying drawings, making a part of this specification, in which—

Letters of like name and kind designate like parts in each of the figures.

This device is a combination of sower, harrow, and roller, designed to perform the work of sowing, harrowing, and rowing at one and the same operation, by means of a sower so regulated and adjusted as to be operated by the turning of one of the wheels upon which the machine rests, which sower deposits the seed upon the ground, immediately followed by an adjustable harrow, which enters the ground to any depth desired, making furrows, or holes, into which the seed may be pressed and covered by the roller which follows, which roller is self-adjustable, so as to operate upon uneven ground.

This machine consists of a frame of wood, A A A, made of two side-pieces, connected by two cross-bars, near each end, of suitable dimensions, with a tongue-roller at the front, where the team would be attached.

Upon the forward part of this frame, which rests upon four wheels, turning upon fixed axles, is a seed-box, B, about as long as the width of the frame, open at the top, except in the centre, where it is covered sufficiently to give a seat to the driver, and tapering from the top to the bottom.

This seed-box B has a double bottom, of which the lower part, composed of any suitable sheet-metal, fits closely, and is immovable, and has its sides rolling slightly over the edges of the upper, or false bottom, which last is shorter than box B, so as to confine it pretty closely, and yet allow it to slide back and forth laterally.

Each of these bottoms has holes, or slits $a\,a\,a$, in it, to the number of seven or more, at regular intervals, and so placed that in certain positions of the false bottom the holes, or slits coincide, and seed in the box may fall through to the ground, while in other positions the holes, or slits in the lower bottom would be completely covered, and the box be seed-tight.

This false bottom has a lug, $b$, fastened to its top, to which one end of the connecting-rod, $c$, is pivoted, the opposite end of said rod being pivoted to crank $d$, upon vertical shaft $e\,e$.

Figure 1:
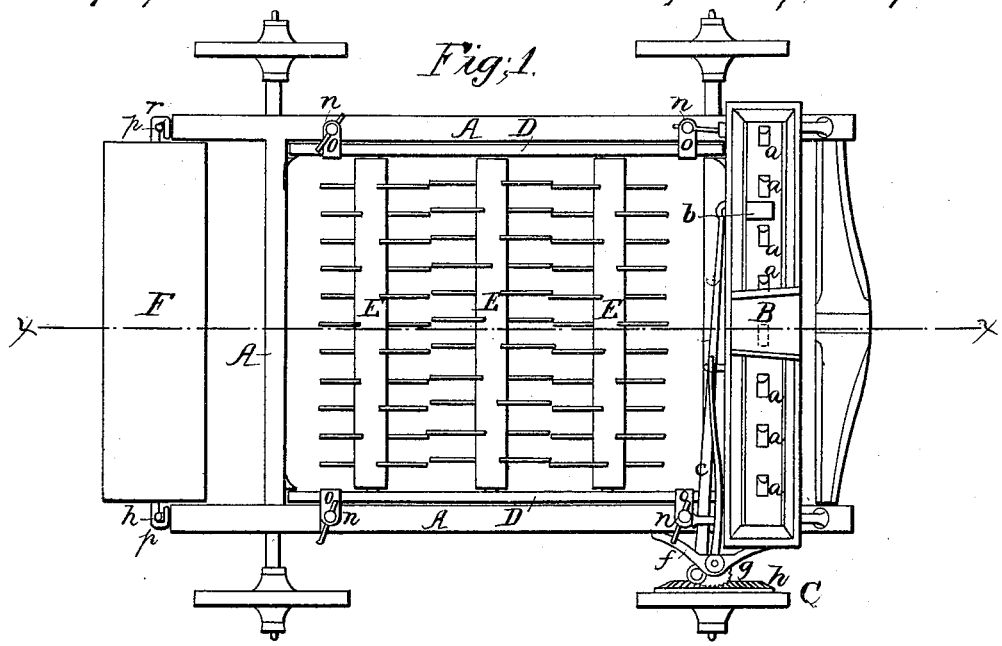
Figure 1 is a plan view of the improved machine.
Figure 2:
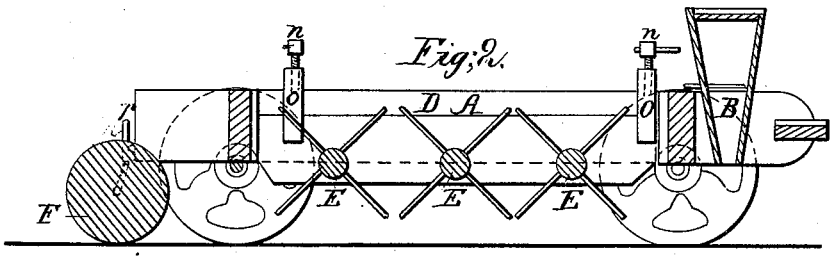
Figure 2 is a longitudinal vertical section of the same, on the line $x\,x$ of fig. 1.
Figure 3:
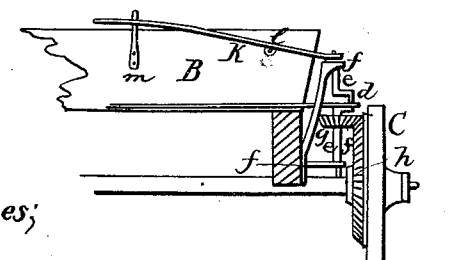
Figure 3 is a broken cross-section, showing the devices for operating the sower.
Figure 4:
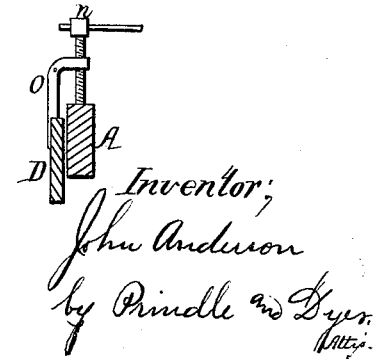
Figure 4 is a broken cross-section, showing the device for adjusting the harrows.

This shaft $e\,e$ is supported vertically between the wheel C and the frame, by bearings $f\,f$, one at the bottom and one at the top, fastened to the outside of the frame, as displayed in fig. 3, or in any other suitable method.

Upon this shaft $e\,e$ is a bevel-pinion, $g$, which is turned by the bevel-wheel $h$, which last is securely fastened upon the inner side of wheel C, and is somewhat less in diameter than said wheel C.

To the top of shaft $e\,e$, and above the upper bearing thereof, is connected a lever, $k$, through which a fulcrum-bolt, $l$, passes, secured to the back of box B, by means of which the shaft $e\,e$ may be raised and the bevel-pinion $f$ be thrown out of gear.

The inner end of lever $k$ may be engaged with catch $m$, fastened to the rear side of box B, by means of which the bevel-pinion $g$ may be kept in gear or out of gear.

When the machine is in motion, the revolution of wheel C turns bevel-wheel $h$, which turns bevel-pinion $g$, which gives crank $d$ a rotary motion, which is communicated by connecting-rod $c$, by means of lug $b$, to the false bottom of seed-box B, giving said false bottom an oscillating motion from side to side, alternately opening and shutting the seed-holes $a\,a\,a$, while the driver may at any time, when the crank $d$ is at right angles with the axles, or at any proper angle, by pressing down the inner end of lever $k$, throw bevel-pinion $g$ out of gear, have the motion of the false bottom cease, and the seed-holes close.

Behind seed-box B, and fitting into a movable frame D D, composed of two side-pieces, fitting closely inside of side-pieces A A, and confined at the corners by angle-pieces, are harrow-rollers E E E, three or less in number, equidistant from each other, composed of cylindrical shafts, turning in side-pieces D D, with teeth of suitable material projecting from them.

The harrow-frame D D is adjustable by means of screws $n\,n\,n\,n$, passing through bent arms $o\,o\,o\,o$, fastened to the insides of side-pieces D D, and running down through bed-pieces fastened upon the tops of side-pieces A A, in such manner that said screws $n\,n\,n\,n$ swivel in said bed-pieces.

These screws $n\,n\,n\,n$ are furnished with levers, passing through their heads, by turning which to right or left the harrow-frame and harrow may be raised or lowered.

To the outer end of the machine is attached a self-adjustable cylindrical roller, F, of suitable size and material, which is pivoted upon suitable rods $p\,p$, bent upward and inward, at right angles, in the same line of direction.

These rods $p\,p$, in turn, are placed over right-angled guides $r\,r$, fastened into the rear ends of side-pieces A A, between which guides $r\,r$ and the rear ends of said side-pieces A A the rods $p\,p$ slide up or down, as the roller F rises or falls, adjusting the same to the inequalities of the ground.

When this machine is attached to a team, and ready for work in the field, with the seed box B filled, the driver locks lever $k$, so as to throw bevel-pinion $g$ in gear, and drives on in the desired direction.

The turning of wheel C, by means of the devices before described, causes the seed to fall regularly upon the ground. The harrow, following, makes holes and furrows of depth required, into which the seed falls, and the roller, coming after, covers the seed, and leaves the ground sufficiently smooth and compact.

The driver then, at will, by use of lever $k$, puts the bevel-pinion $g$ out of gear, and closes the seed-box B.

By its proper device, he elevates or depresses the harrow E E E, or takes it out altogether, or, if he pleases, may easily disengage and lay aside roller F.

He may use the sower with or without the harrow and roller, or with or without either of them, and the harrow and roller in the same way, with or without the sower, or either of them separately.

What I claim as my invention, and desire to secure by Letters Patent, is—

The construction and arrangement of the harrows E E, &c., and frame D, made adjustable vertically by means of the screws $n\ n$, &c., substantially as and for the purpose shown.

Also, in combination with the frame of the machine A and the harrow-frame D, the screws $n\ n$, &c., substantially as and for the purpose specified.

Also, the means employed for connecting the roller F to the rear end of the frame A, consisting of the angle pivot-rods $p\ p$ and guides $r\ r$, substantially as shown and described.

Also, the within-described agricultural implement, consisting of a sower, or seeder, harrow and roller, all constructed and arranged to operate substantially as and for the purpose herein shown and described.

In testimony that I claim the foregoing, I have hereunto set my hand, this 18th day of February, 1869.

JOHN ANDERSON.

Witnesses:
GEO. O. MARCY,
JAMES CAHILL.